United States Patent
Lin

(10) Patent No.: US 11,362,780 B2
(45) Date of Patent: Jun. 14, 2022

(54) DMRS SEQUENCE TRANSMITTING METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/534,367

(22) Filed: Aug. 7, 2019

(65) Prior Publication Data

US 2019/0363851 A1  Nov. 28, 2019

Related U.S. Application Data

(63) Continuation of application No. PCT/CN2017/073072, filed on Feb. 7, 2017.

(51) Int. Cl.
*H04L 5/00* (2006.01)
*H04W 72/04* (2009.01)

(52) U.S. Cl.
CPC .......... *H04L 5/0048* (2013.01); *H04L 5/0007* (2013.01); *H04W 72/042* (2013.01)

(58) Field of Classification Search
CPC . H04L 5/0048; H04L 5/0007; H04L 27/2611; H04L 5/0051; H04L 5/0094; H04L 27/261; H04L 5/0028; H04L 5/0026; H04W 72/042; H04W 72/04
See application file for complete search history.

(56) References Cited

U.S. PATENT DOCUMENTS

2012/0093124 A1    4/2012   Zhang et al.
2014/0293944 A1*  10/2014   Kim ...................... H04L 5/0023
                                                                  370/329

(Continued)

FOREIGN PATENT DOCUMENTS

CN    102076076 A    5/2011
CN    102150387 A    8/2011

(Continued)

OTHER PUBLICATIONS

Intel Corporation , 3GPP TSG RAN WG1 NR Ad-Hoc meeting, R1-1700352, Downlink DM-RS design for NR, Spokane, USA, Jan. 16-20, 2017.

(Continued)

*Primary Examiner* — Jackie Zuniga Abad

(57) ABSTRACT

A wireless communication method, a terminal device and a network device can realize multi-user multiplexing of terminal devices that transmit DMRS sequences using different multiple access modes. The method includes: determining, by a terminal device, a quantity K of demodulation reference signal DMRS sequences corresponding to a first DMRS port and a physical resource occupied by each DMRS sequence in the K DMRS sequences, where K is a positive integer; and sending, on the determined physical resource occupied by the each DMRS sequence, the each DMRS sequence to a network device using the first DMRS port.

18 Claims, 7 Drawing Sheets

(56) References Cited

U.S. PATENT DOCUMENTS

| | | | |
|---|---|---|---|
| 2015/0092722 A1* | 4/2015 | Zhang | H04L 5/0048 370/329 |
| 2015/0244439 A1 | 8/2015 | Nam et al. | |
| 2017/0005765 A1 | 1/2017 | Park et al. | |
| 2019/0357159 A1* | 11/2019 | Pan | H04L 5/0007 |

FOREIGN PATENT DOCUMENTS

| | | |
|---|---|---|
| CN | 103299556 A | 9/2013 |
| CN | 103841644 A | 6/2014 |
| CN | 104009831 A | 8/2014 |
| CN | 104125186 A | 10/2014 |
| CN | 104137461 A | 11/2014 |
| CN | 106559363 A | 4/2017 |
| RU | 2012117809 A | 11/2013 |
| WO | 2013062231 A1 | 5/2013 |
| WO | 2015188355 A1 | 12/2015 |
| WO | 2017/019132 A1 | 2/2017 |

OTHER PUBLICATIONS

Qualcomm Incorporated, 3GPP TSG-RAN WG1 NR Ad-Hoc, R1-1700806, Discussion on DL DMRS design, 16th - Spokane, Washington, USA, Jan. 20, 2017.

Nokia, Alcatel-Lucent Shanghai Bell, 3GPP TSG RAN WG1 NR Ad-Hoc Meeting, R1-1701103, On the DMRS structure for NR physical data channels, Spokane, USA, Jan. 16-20, 2017.

The Notice of Allowance of corresponding Russian application No. 2019127051, dated May 26, 2020.

The EESR of corresponding European application No. 17896240.3, dated Jun. 12, 2020.

Huawei et al; "UL DMRS Design for data transmission", 3GPP Draft; R1-1700071, 3rd Generation Partnership Project (3GPP), Mobile Competence Centre; 650; Route Des Lucioles; F-06921 Sophia-Antipolis Cedex; France, vol. RAN WG1, No. Spokane, USA; Jan. 16, 2017-Jan. 20, 2017 Jan. 16, 2017(Jan. 6, 2017), XP051207613.

Hsiech Chia-Yu et al:"LMMSE-Based Channel Estimation for LTE-Advanced MIMO Downlink Employing UE-Specific References Signals", 2015 IEEE 81st Vehicular Technology Conference (VTC Spring), IEEE, May 11, 2015(May 11, 2015), pp. 1-6, XP033167384.

Ericsson:"Design aspects of sPUSCH", 3GPP Draft; R1-1611522, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 4, 2016(Nov. 4, 2016), XP051189120.

Huawei et al:"Evaluation results of DMRS design for DL data channel", 3GPP Draft, R1-1701693; 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017 Feb. 6, 2017(Feb. 6, 2017). XP051220568.

ZTE et al:"DL DMRS design in sTTI", 3GPP Draft; R1 -1701975 DL DMRS Design in STTI, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017 Feb. 6, 2017(Feb. 6, 2017). XP051220271.

The Second Office Action of corresponding Chinese application No. 201 780085526.6, dated Jul. 29, 2020.

Supplementary Partial search report of corresponding European application No. 17896240.3, dated Jan. 27, 2020.

The Chinese First Examination Report of corresponding Chinese application No. 201780085526.6 dated Mar. 26, 2020.

Qualcomm Incorporated; "Discussion on UL DMRS design", 3GPP TSG-RAN WG1 RAN1 AdHoc; Jan. 16-20, 2017; Spokane, USA; R1-1700805, 4 pages.

Nokia, Alcatel-Sucent Shanghai Bell; "On details of sPUSCH layout and UL DMRS signaling", 3GPP TSG-RAN WG1 Meeting #88, Athens, Greece, Feb. 13-17, 2017; R1-1701998; 7 pages.

International Search Report PCT/CN2017/073072; mailed Oct. 27, 2017.

The first Office Action of corresponding European application No. 17896240.3, dated Jan. 26, 2021.

The first Office Action of corresponding Japanese application No. 2019-542686, dated Mar. 2, 2021.

The first Office Action of corresponding Indian application No. 201917034419, dated Mar. 24, 2021.

The first Office Action of corresponding Canadian application No. 3052871, dated Sep. 16, 2020.

The third Office Action of corresponding Chinese application No, 201780085526.6; dated Oct. 27, 2020.

The First Office Action of corresponding Chilean application No. 2019002214, dated Oct. 27, 2020.

The second Office Action of corresponding Canadian application No. 3052871, dated Jun. 30, 2021.

The first Office Action of corresponding Indonesian application No. P00201907581, dated Sep. 18, 2021.

The first Office Action of corresponding Israeli application No. 268563, dated Oct. 7, 2021.

The first Office Action of corresponding European application No. 17896240.3, dated Oct. 26, 2021.

The first Office Action of corresponding Australian application No. 2017397672, dated Nov. 10, 2021.

The Decision of Refusal of corresponding Japanese application No. 2019-542686, dated Dec. 3, 2021.

* cited by examiner

DMRS SEQUENCE TRANSMITTING METHOD, TERMINAL DEVICE AND NETWORK DEVICE

CROSS-REFERENCE TO RELATED APPLICATION

This application is a continuation of International Application No. PCT/CN2017/073072, filed on Feb. 7, 2017, the disclosure of which is hereby incorporated by reference in its entirety.

TECHNICAL FIELD

The present disclosure relates to the field of communication, and more particularly, to a wireless communication method, a terminal device, and a network device.

BACKGROUND

In a wireless communication system, a demodulation reference signal (DMRS) sequence may be used for correlation demodulation of a channel. When multi-user multiplexing is performed in an uplink, orthogonality may be obtained between different terminal devices by using a same DMRS sequence, but different cyclic shifts or different orthogonal codes. A number of terminal devices that use orthogonal codes to obtain orthogonality for supporting multiplexing is small.

The terminal device may use, for example, discrete Fourier transform orthogonal frequency division multiplexing based spread spectrum (DFT-S-OFDM) multiple access mode or cyclic prefix orthogonal frequency division multiplexing (CP-OFDM) multiple access mode for uplink transmission. The DFT-S-OFDM multiple access mode may also be referred to as single carrier-frequency division multiple access (SC-FDMA) mode. The CP-OFDM system may also be referred to as orthogonal frequency division multiple access (OFDMA) mode.

How to realize multi-user multiplexing performed by terminal devices that transmit DMRS sequences using different multiple access modes is an urgent problem to be solved.

SUMMARY

Implementations of the present disclosure provide a wireless communication method, a terminal device and a network device, which can realize multi-user multiplexing performed by terminal devices that transmit DMRS sequences using different multiple access modes.

A first aspect provides a wireless communication method, including:

determining, by a terminal device, a quantity K of demodulation reference signal DMRS sequences corresponding to a first DMRS port and a physical resource occupied by each DMRS sequence in the K DMRS sequences, where K is a positive integer; and sending, on the determined physical resource occupied by the each DMRS sequence, the each DMRS sequence to a network device using the first DMRS port.

In combination with the first aspect, in a possible implementation of the first aspect, the determining, by a terminal device, a quantity K of DMRS sequences corresponding to a first DMRS port and a physical resource occupied by each DMRS sequence in the K DMRS sequences, includes:

determining, by the terminal device, the quantity K of the DMRS sequences corresponding to the first DMRS port and/or the physical resource occupied by the each DMRS sequence in the K DMRS sequences according to a multiple access mode used in sending the DMRS sequences using the first DMRS port.

In combination with the first aspect or any one of the above possible implementations thereof, in a possible implementation of the first aspect, the determining, by the terminal device, the quantity K of the DMRS sequences corresponding to the first DMRS port according to a multiple access mode used in sending the DMRS sequences using the first DMRS port, includes:

determining the quantity K of the DMRS sequences corresponding to the first DMRS port according to a first corresponding relation and the multiple access mode used in sending the DMRS sequences using the first DMRS port;

where, the first corresponding relation is configured to indicate a quantity of DMRS sequences corresponding to the first DMRS port under each multiple access mode in at least one multiple access mode.

In combination with the first aspect or any one of the above possible implementations thereof, in a possible implementation of the first aspect, the determining, by the terminal device, the physical resource occupied by the each DMRS sequence in the K DMRS sequences according to a multiple access mode used in sending the DMRS sequences using the first DMRS port, includes:

determining the physical resource occupied by the each DMRS sequence in the K DMRS sequences according to a second corresponding relation and the multiple access mode used in sending the DMRS sequences using the first DMRS port;

where, the second corresponding relation is configured to indicate a physical resource corresponding to each DMRS sequence in at least one DMRS sequence corresponding to the first DMRS port under each multiple access mode in at least one multiple access mode.

In combination with the first aspect or any one of the above possible implementations thereof, in a possible implementation of the first aspect, when the multiple access mode used in sending the DMRS sequences using the first DMRS port is a first multiple access mode, the K DMRS sequences include a first DMRS sequence, where the first DMRS sequence occupies a same physical resource and/or uses a same root sequence as a second DMRS sequence included in DMRS sequences transmitted using a same DMRS port when a second multiple access mode is used, where the second multiple access anode is difference from the first multiple access mode.

In combination with the first aspect or any one of the above possible implementations thereof, in a possible implementation of the first aspect, the first multiple access mode is a discrete Fourier transform orthogonal frequency division multiplexing based spread spectrum DFT-S-OFDM multiple access mode, and the second multiple access mode is a cyclic prefix orthogonal frequency division multiplexing CP-OFDM multiple access mode; or, the first multiple access mode is the CP-OFDM multiple access mode, and the second multiple access mode is the DFT-S-OFDM multiple access mode.

In combination with the first aspect or any one of the above possible implementations thereof, in a possible implementation of the first aspect, when the multiple access mode used in sending the DMRS sequences using the first DMRS port is a DFT-S-OFDM multiple access mode, K is an integer greater than 1; and/or, when the multiple access mode used in sending the DMRS sequences using the first DMRS port is a CP-OFDM multiple access mode, K is 1.

In combination with the first aspect or any one of the above possible implementations thereof, in a possible implementation of the first aspect, the determining, by a terminal device, a quantity K of demodulation reference signal DMRS sequences corresponding to a first DMRS port, includes:

determining, by the terminal device, the quantity K of the DMRS sequences corresponding to the first DMRS port according to DMRS sequence indication information carried in downlink control information DCI transmitted by scheduling data corresponding to the DMRS sequences by the network device.

In combination with the first aspect or any one of the above possible implementations thereof, in a possible implementation of the first aspect, K is an integer greater than 1.

In combination with the first aspect or any one of the above possible implementations thereof, in a possible implementation of the first aspect, when a value of K is greater than 1, DMRS sequences in the K DMRS sequences having a same length uses a same sequence.

In combination with the first aspect or any one of the above possible implementations thereof, in a possible implementation of the first aspect, when a value of K is greater than 1, the each DMRS sequence in the K DMRS sequences occupies, in at least one orthogonal frequency division multiplexing OFDM symbol, different sub-carriers in a same frequency domain bandwidth respectively.

In combination with the first aspect or any one of the above possible implementations thereof, in a possible implementation of the first aspect, a sub-carrier occupied by an $m^{th}$ DMRS sequence in the K DMRS sequences is: an $(m+iK)^{th}$ sub-carrier in the frequency domain bandwidth, where $i=0,1 \ldots \lfloor(S-m)/K\rfloor$, and S is a quantity of sub-carriers included in the frequency domain bandwidth.

In combination with the first aspect or any one of the above possible implementations thereof, in a possible implementation of the first aspect, K=2, and a subcarrier occupied by a first DMRS sequence in the K DMRS sequences is an $(n+jN)^{th}$ subcarrier in the frequency domain bandwidth, and a second DMRS sequence occupies the rest subcarrier in the frequency domain bandwidth, where $j=0,1 \ldots \lfloor(S-n)/N\rfloor$, N is a positive integer greater than 1, and n is a positive integer less than or equal to N.

In combination with the first aspect or any one of the above possible implementations thereof, in a possible implementation of the first aspect, each DMRS sequence in at least one DMRS sequence in the K DMRS sequences occupies different sub-carriers in different OFDM symbols.

In combination with the first aspect or any one of the above possible implementations thereof, in a possible implementation of the first aspect, the determining, by a terminal device, a quantity K of DMRS sequences corresponding to a first DMRS port and a physical resource occupied by each DMRS sequence in the K DMRS sequences includes:

determining, by the terminal device, the quantity K of the DMRS sequences corresponding to the first DMRS port; and determining, by the terminal device, a resource offset between physical resources occupied by different DMRS sequences in the K DMRS sequences according to the quantity K when the K is greater than 1.

A second aspect provides a wireless communication method, including:

determining, by a network device, a quantity K of demodulation reference signal DMRS sequences sent by a terminal device using a first DMRS port, and a physical resource occupied by each DMRS sequence in the K DMRS sequences; and receiving, on the determined physical resource occupied by the each DMRS sequence, the each DMRS sequence sent by the terminal device.

In combination with the second aspect, in a possible implementation of the second aspect, the determining, by a network device, a quantity K of demodulation reference signal DMRS sequences sent by a terminal device using a first DMRS port and a physical resource occupied by each DMRS sequence in the K DMRS sequences, includes:

determining, by the network device, the quantity K of the DMRS sequences sent by the terminal device using the first DMRS port and/or the physical resource occupied by the each DMRS sequence in the K DMRS sequences according to a multiple access mode used by the terminal device in sending the DMRS sequences using the first DMRS port.

In combination with the second aspect or any one of the above possible implementations thereof, in a possible implementation of the second aspect, the determining, by the network device, the quantity K of the DMRS sequences sent by the terminal device using the first DMRS port according to a multiple access mode used by the terminal device in sending the DMRS sequences using the first DMRS port includes:

determining the quantity K of the DMRS sequences sent by the terminal device using the first DMRS port according to a first corresponding relation and the multiple access mode used by the terminal device in sending the DMRS sequences using the first DMRS port; where, the first corresponding relation is configured to indicate a quantity of DMRS sequences corresponding to the first DMRS port under each multiple access mode in at least one multiple access mode.

In combination with the second aspect or any one of the above possible implementations thereof, in a possible implementation of the second aspect, the determining, by the network device, the physical resource occupied by the each DMRS sequence in the K DMRS sequences according to a multiple access mode used by the terminal device in sending the DMRS sequences using the first DMRS port, includes:

determining the physical resource occupied by the each DMRS sequence in the K DMRS sequences according to a second corresponding relation and the multiple access mode used by the terminal device in sending the DMRS sequences using the first DMRS port; where, the second corresponding relation is configured to indicate a physical resource corresponding to each DMRS sequence in at least one DMRS sequence corresponding to the first DMRS port under each multiple access mode in at least one multiple access mode.

In combination with the second aspect or any one of the above possible implementations thereof, in a possible implementation of the second aspect, the method further includes:

indicating, by the network device, the quantity K of the DMRS sequences corresponding to the first DMRS port to the terminal device by DMRS sequence indication information carried in downlink control information DCI transmitted by scheduling data corresponding to the DMRS sequences.

In combination with the second aspect or any one of the above possible implementations thereof, in a possible implementation of the second aspect, when the multiple access mode used by the terminal device in sending the DMRS sequences using the first DMRS port is a DFT-S-OFDM multiple access mode, K is an integer greater than 1; and/or, when the multiple access mode used by the terminal device in sending the DMRS sequences using the first DMRS port is a CP-OFDM multiple access mode, K is 1.

In combination with the second aspect or any one of the above possible implementations thereof, in a possible implementation of the second aspect, K is an integer greater than 1.

In combination with the second aspect or any one of the above possible implementations thereof, in a possible implementation of the second aspect, when a value of K is greater than 1, the each DMRS sequence in the K DMRS sequences occupies, in at least one OFDM symbol, different sub-carriers in a same frequency domain bandwidth respectively.

In combination with the second aspect or any one of the above possible implementations thereof, in a possible implementation of the second aspect, each DMRS sequence in at least one DMRS sequence in the K DMRS sequences occupies different sub-carriers in different OFDM symbols.

A third aspect provides a terminal device, which may include a unit configured to implement the method of the first aspect or any one of the possible implementations of the first aspect described above.

A fourth aspect provides a network device, which may include a unit configured to implement the method of the second aspect or any one of the possible implementations of the second aspect described above.

A fifth aspect provides a terminal device, which may include a memory and a processor, where the memory stores an instruction, and the processor is configured to invoke the instruction stored in the memory to perform the method according to the first aspect or any one of the possible implementations of the first aspect.

A sixth aspect provides a network device, which may include a memory and a processor, where the memory stores an instruction, and the processor is configured to invoke the instruction stored in the memory to perform the method according to the second aspect or any one of the possible implementations of the second aspect.

A seventh aspect provides a computer readable medium, configured to store a program code executed by a terminal device, where the program code includes an instruction configured to perform the method according to the first aspect or the various implementations of the first aspect, or includes an instruction configured to perform the method according to the second aspect or the various implementations of the second aspect.

An eighth aspect provides a system chip, including an input interface, an output interface, a processor and a memory, where the processor is configured to execute a code in the memory, and when the code is executed, the processor may implement the method according to the first aspect and the various implementations of the first aspect described above, or perform the method according to the second aspect and the various implementations of the second aspect described above.

Therefore, in the implementations of the present disclosure, a quantity of DMRS sequences corresponding to one DMRS port may not be unique and may be flexibly changed. For example, such corresponding relationship may be set according to a multiple access mode used by a plurality of terminal devices which need orthogonal multiplexing, so that multi-user multiplexing of terminal devices that use different multiple access modes may be supported. Further, since the quantity of the DMRS sequences corresponding to one DMRS port and resource occupied by each sequence may be flexibly changed, it may be realized that there is at least one DMRS sequence in the terminal devices using different multiple access modes that corresponds to a same root sequence and/or occupy a same physical resource, so that the terminal devices using different multiple access modes can obtain DMRS orthogonality by using different cyclic shifts, thereby enabling multi-user multiplexing transmission supporting more terminal devices.

BRIEF DESCRIPTION OF DRAWINGS

In order to more clearly illustrate technical solutions in implementations of the present disclosure, accompanying drawings required for describing the implementations or the prior art will be briefly described below. Obviously, the accompanying drawings in the following description are some of the implementations of the present disclosure, and other drawings can be obtained by those skilled in the art based on these accompanying drawings without any creative effort.

DESCRIPTION OF EMBODIMENTS

Technical solutions in the implementations of the present disclosure will be described in combination with the accompanying drawings in the implementations of the present disclosure. It is obvious that the described implementations are some of, instead all of, the implementations of the present disclosure. All other implementations obtained by those skilled in the art based on the implementations of the present disclosure without any creative effort are within the protection scope of the present disclosure.

The technical solutions of the implementations of the present disclosure can be applied to various communication systems, for example, a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunication system (UMTS), a worldwide interoperability for Microwave Access (WiMAX) communication system or a future 5G system, or the like.

Figure 1:
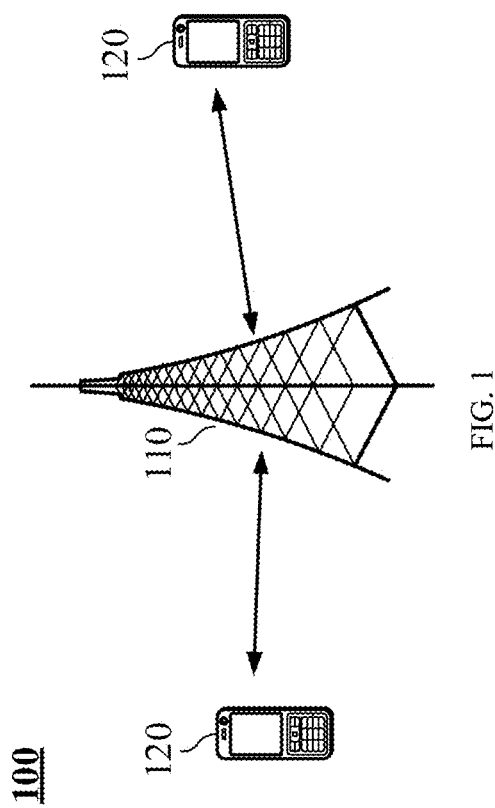
FIG. 1 is a schematic diagram of a wireless communication system according to an implementation of the present disclosure.

FIG. 1 illustrated a wireless communication system 100 applied in the implementations of the disclosure. The wireless communication system 100 may include a network device 110. The network device 110 may be a device communicated with a terminal device. The network device 110 may provide communication coverage for a particular geographic area and may communicate with a terminal device (e.g., a UE) located within the coverage area. In an implementation, the network device 110 may be a base transceiver station (BTS) in a GSM system or a CDMA system, or may be a base station (NodeB, NB) in a WCDMA system, or may also be an evolutional Node B (eNB or eNodeB) in an LTE system, or a wireless controller in a cloud radio access network (CRAN), or the network device may be a relay station, an access point, an in-vehicle device, a wearable device, a network side device in a future 5G network or a network device in a future evolved public land mobile network (PLMN), or the like.

The wireless communication system 100 also includes at least one terminal device 120 located within the coverage of the network device 110. Terminal device 120 may be mobile or stationary. In an implementation, the terminal device 120 may refer to an access terminal, a user equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a session initiation protocol (SIP) phone, a wireless local loop (WLL) station, a personal digital assistant (PDA), a handheld device or a computing device with a wireless communication function, or other processing devices connected to a wireless modem, an in-vehicle device, a wearable device, a terminal devices in a future 5G network, or a terminal device in a future evolved PLMN, or the like.

Alternatively, the 5G system or network may also be referred to as a new radio (NR) system or network.

FIG. 1 exemplarily shows one network device and two terminal devices. In an implementation, the wireless communication system 100 may include a plurality of network devices and other numbers of terminal devices may be located within coverage of each network device, which is not limited in the implementations of the present disclosure.

In an implementation, the wireless communication system 100 may further include other network entities, such as network controllers, mobility management entities, or the like, which is not limited in the implementations of the present disclosure.

It should be understood that the terms "system" and "network" are generally used interchangeably herein. The term "and/or" in the present disclosure is merely a relationships describing associated objects, indicating that there may be three types of relationships, for example, A and/or B may indicate three situations: only A existing, both A and B existing, and only B existing. In addition, the character "/" herein generally indicates that a relationship between contextual objects is "or".

Figure 2:
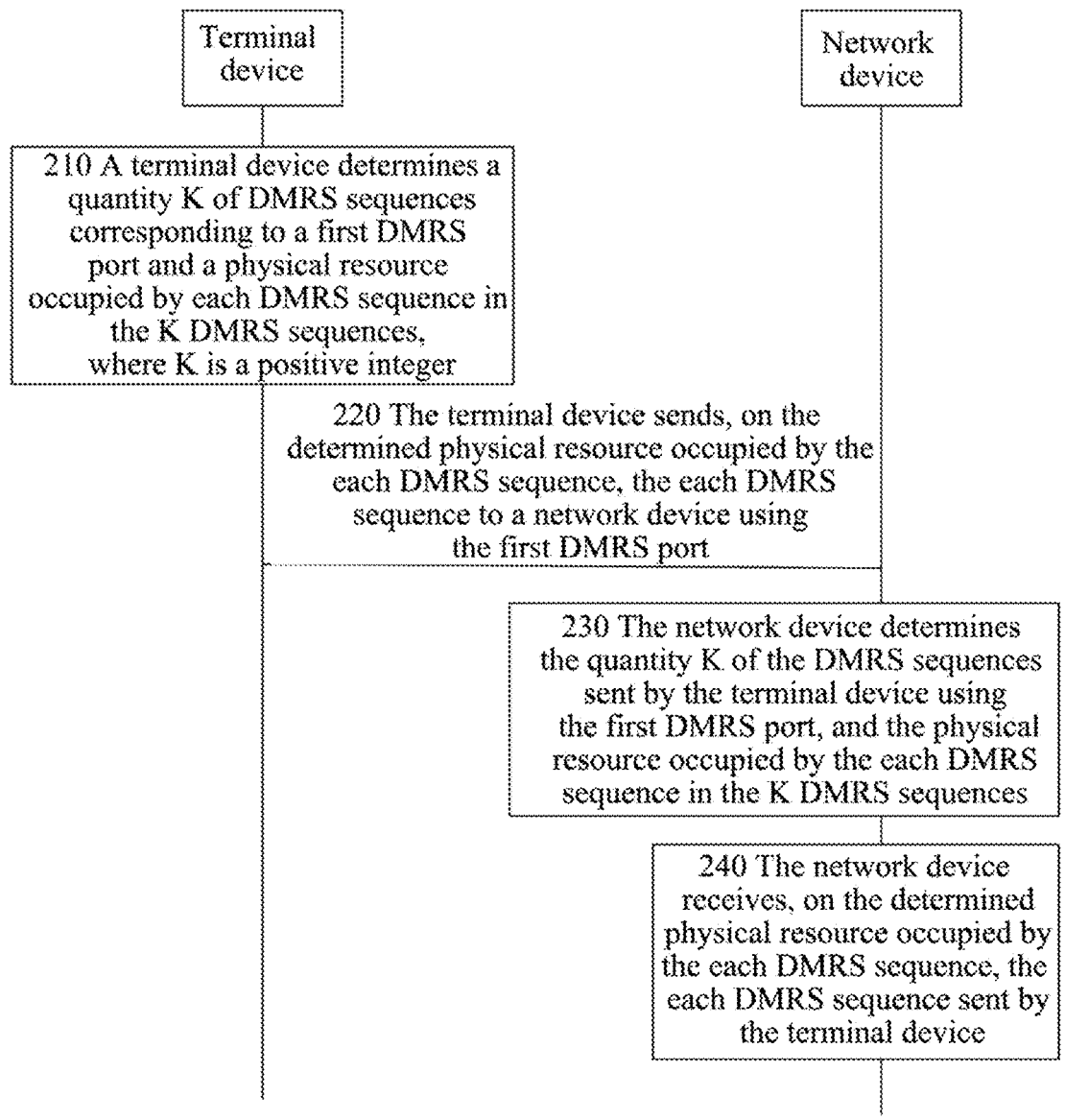
FIG. 2 is a schematic flowchart of a wireless communication method according to an implementation of the present disclosure.

FIG. 2 is a schematic flowchart of a wireless communication method 200 according to an implementation of the present disclosure. In an implementation, the method 200 may be used in the wireless communication system 100 described above.

As shown in FIG. 2, the method 200 may include the following:

In 210, a terminal device determines a quantity K of DMRS sequences corresponding to a first DMRS port and a physical resource occupied by each DMRS sequence in the K DMRS sequences, where K is a positive integer.

K may equal to or greater than 1. For example, K may be 2, 3, 4, 6 or the like.

The first DMRS port includes at least one DMRS port in N DMRS ports currently used by the terminal device. When the first DMRS port includes all the N DMRS ports currently used by the terminal device, K is a total sum of DMRS sequences corresponding to all the N DMRS ports currently used by the terminal device.

In an implementation, DMRS sequences transmitted through the N DMRS ports may occupy a same physical resource, but use different cyclic shifts.

In an implementation, quantities of DMRS sequences corresponding to different sequences may be the same or different.

In an implementation, the physical resource occupied by the DMRS sequences may be a time domain resource, a frequency domain resource and/or an airspace resources, or the like.

In the implementation of the present disclosure, the terminal device may determine the quantity K of the DMRS sequences corresponding to the first DMRS port and the physical resource occupied by the each DMRS sequence in the K DMRS sequences in multiple manners.

In an implementation, the terminal device may determine the quantity K of the DMRS sequences corresponding to the first DMRS port according to DMRS sequence indication information carried in downlink control information DCI transmitted by scheduling data corresponding to the DMRS sequences by the network device.

In an implementation, the terminal device determines the quantity K of the DMRS sequences corresponding to the first DMRS port and/or the physical resource occupied by the each DMRS sequence in the K DMRS sequences according to a multiple access mode used in sending the DMRS sequences using the first DMRS port. DMRS resource patterns corresponding to different multiple access modes may be different.

Specifically, the terminal device may determine the quantity K of the DMRS sequences corresponding to the first DMRS port according to a first corresponding relation and the used multiple access mode; where, the first corresponding relation is configured to indicate a quantity of DMRS sequences corresponding to the first DMRS port under each multiple access mode in at least one multiple access mode.

The terminal device may determine the physical resource occupied by the each DMRS sequence in the K DMRS sequences according to a second corresponding relation and the used multiple access mode; where, the second corresponding relation is configured to indicate a physical resource corresponding to each DMRS sequence in at least one DMRS sequence corresponding to the first DMRS port under each multiple access mode in the at least one multiple access mode.

The first corresponding relation and/or the second corresponding relation may be notified by the network device to the terminal device, or may be pre-configured by the terminal device, or may be pre-agreed by the terminal device and the network device.

It should be understood that, the terminal device may determine the quantity K, but not the physical resources occupied by the K sequences, according to the used multiple access modes, where the physical resource of each sequence is preset or configured by the network device.

Alternatively, the terminal device may determine the quantity K according to the DCI sent by the network device, and determine the physical resource occupied by the each sequence in the K DMRS sequences according to the used multiple access mode.

In an implementation, when the used multiple access mode is a CP-OFDM multiple access mode, K is 1.

Specifically, when the multiple access mode used by the terminal device in sending the DMRS sequences is the CP-OFDM multiple access mode, the terminal device may send only one DMRS sequence.

Figure 3:
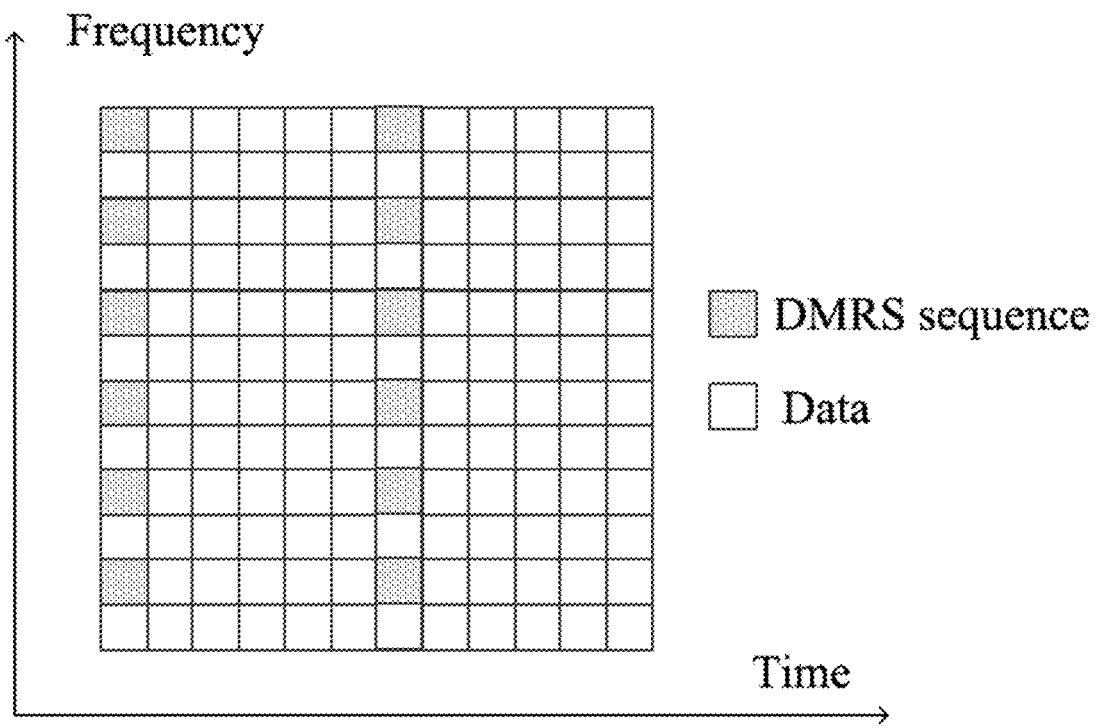
FIG. 3 is a schematic diagram of resource occupancy of a DMRS sequence according to an implementation of the present disclosure.

The one DMRS sequence may use a discrete resource element (RE), and on the OFDM symbol where DMRS is transmitted, the DMRS sequence occupies a part of subcarriers, and other subcarriers may be configured to transmit data, specifically, as shown in FIG. 3.

Of course, when the used multiple access mode is the CP-OFDM multiple access mode, K may also be greater than 1.

In an implementation, when the used multiple access mode is a DFT-S-OFDM multiple access mode, K may be an integer greater than 1.

In the implementation of the present disclosure, in a situation where the terminal devices performing multi-user multiplexing use different multiple access modes, there is at least one DMRS sequence in DMRS sequences sent by the terminal devices that occupies a same physical resource and/or a same root sequence as at least one DMRS sequence of the rest terminal devices.

Alternatively, in the implementation, in a situation where the terminal devices may select multiple access modes, there is at least one DMRS sequence in DMRS sequences sent through the various multiple access modes selected by the terminal devices that occupies a same physical resource and/or a same root sequence as at least one DMRS sequence in DMRS sequences sent by selecting other multiple access modes.

In an implementation, when the used multiple access mode is the DFT-S-OFDM multiple access mode, the K DMRS sequences include a first DMRS sequence, where the first DMRS sequence occupies a same physical resource and/or uses a same root sequence as a second DMRS sequence transmitted using a same DMRS port when the used multiple access mode is the CP-OFDM multiple access mode.

Specifically, when the used multiple access mode is the DFT-S-OFDM multiple access mode, the K DMRS sequences include the first DMRS sequence, where the first DMRS sequence occupies the same physical resource and/or uses the same root sequence as the second DMRS sequence transmitted using the same DMRS port when the terminal device uses the CP-OFDM multiple access mode.

Alternatively, when the used multiple access mode is the DFT-S-OFDM multiple access mode, the K DMRS sequences include the first DMRS sequence, where the first DMRS sequence occupies the same physical resource and/or uses the same root sequence as the second DMRS sequence transmitted using the same DMRS port when the other terminal devices use the CP-OFDM multiple access mode.

In an implementation, when the used multiple access mode is the CP-OFDM multiple access mode, the K DMRS sequences include the second DMRS sequence, where the second DMRS sequence occupies the same physical resource and/or uses the same root sequence as the first DMRS sequence in multiple DMRS sequences transmitted using the same DMRS port when the used multiple access mode is the DFT-S-OFDM multiple access mode.

Specifically, when the used multiple access mode is the CP-OFDM multiple access mode, the K DMRS sequences include the second DMRS sequence, where the second DMRS sequence occupies the same physical resource and/or uses the same root sequence as the first DMRS sequence in the multiple DMRS sequences transmitted using the same DMRS port when the terminal device uses the DFT-S-OFDM multiple access mode.

Alternatively, in an implementation, when the used multiple access mode is the CP-OFDM multiple access mode, the K DMRS sequences include the second DMRS sequence, where the second DMRS sequence occupies the same physical resource and/or uses the same root sequence as the first DMRS sequence in the multiple DMRS sequences transmitted using the same DMRS port when the other terminal devices use the DFT-S-OFDM multiple access mode.

It should be understood that, the multiple access mode is illustrated as the CP-OFDM multiple access mode and the DFT-S-OFDM multiple access mode in the implementation of the present disclosure, but the multiple access mode in the implementation of the present disclosure may also be other multiple access modes, which is not limited in the present disclosure.

Therefore, in the implementation of the present disclosure, determining the quantity of the DMRS sequences sent by one DMRS port and/or the resource of each DMRS sequence according to the multiple access mode may enable that there is at least one DMRS sequences in the terminal devices using different multiple access modes that occupies a same physical resource and/or uses a same root sequence, so that the terminal devices using different multiple access modes can obtain DMRS orthogonality by using different cyclic shifts, thereby enabling flexible multi-user multiplexing transmission.

In an implementation, when a value of K is greater than 1, the each DMRS sequence in the K DMRS sequences occupies, in at least one OFDM symbol, different subcarriers in a same frequency domain bandwidth respectively. Such same frequency domain bandwidth may be a transmission bandwidth of data corresponding to the DMRS sequences.

In an implementation, a sub-carrier occupied by an $m^{th}$ DMRS sequence in the K DMRS sequences is: an $(m+iK)^{th}$ sub-carrier in the frequency domain bandwidth, where $i=0,1 \ldots \lfloor(S-m)/K\rfloor$, and S is a quantity of sub-carriers included in the frequency domain bandwidth.

In an implementation, K=2, and a subcarrier occupied by a first DMRS sequence in the K DMRS sequences is an $(n+jN)^{th}$ subcarrier in the frequency domain bandwidth, and a second DMRS sequence occupies the rest subcarrier in the frequency domain bandwidth, where $j=0,1 \ldots \lfloor(S-n)/N\rfloor$, N is a positive integer greater than 1, and n is a positive integer less than or equal to N.

A value of n or N may be notified by the network device to the terminal device through a downlink signaling, or may a preset value in the network device and the terminal device.

For example, the network device may indicate the value to the terminal device by DCI transmitted by scheduling data corresponding to the DMRS sequences, or preconfigure the value for the terminal device through an upper layer signaling. Different manners may be used to obtain the values of n and N. For example, n may be indicated to the terminal device by the DCI, and N may be a preset fixed value in the terminal device and the network device.

n and N may have different values in different OFDM symbols. For example, in an OFDM symbol transmitting the DMRS, n=1 and N=2, and in another OFDM symbol transmitting the DMRS, n=2 and N=2. Alternatively, in four OFDM symbols transmitting DMRSs, the values of n respectively are n=1, 2, 3, 4, and N=4.

In an implementation, each DMRS sequence in at least one DMRS sequence in the K DMRS sequences occupies different sub-carriers in different OFDM symbols.

Specifically, the subcarriers occupied by the same DMRS subsequence in different OFDM symbols may use a fixed subcarrier offset, or the same DMRS subsequence may use different frequency domain densities in different OFDM symbols.

In an implementation, when the value of K is greater than 1, DMRS sequences in the K DMRS sequences having a same length use a same sequence.

For example, it may be a ZC (Zadoff-Chu) sequence generated by using a same sequence length and a same root sequence ID, so that a peak-to-average ratio can be effectively reduced compared to that when different sequences are used.

In an implementation, the terminal device determines the quantity K of the DMRS sequences corresponding to the first DMRS port; and the terminal device determines a resource offset between physical resources occupied by different DMRS sequences in the K DMRS sequences according to the quantity K when the K is greater than 1.

The value of K may be used to determine that the resource offset is a value in {0, 1, . . . , K-1}. For example, the terminal device may determine, according to the value of K, that the resource offset is a value in {0, 1, . . . , K-1}. The resource offset may be a time domain resource offset or a frequency domain resource offset. For example, physical resources of different sub-sequences may be offset by n subcarriers, or offset by n OFDM symbols, where n is an integer greater than or equal to 0 and less than K. The present allocation does not limit that it is the terminal device that determinate the resource offset according to the value of K.

In 220, the terminal device sends, on determined the physical resource occupied by the each DMRS sequence, the each DMRS sequence to a network device using the first DMRS port.

In 230, the network device determines the quantity K of the demodulation reference signal DMRS sequences sent by the terminal device using the first DMRS port and the physical resource occupied by the each DMRS sequence in the K DMRS sequences.

In an implementation, the network device determines the quantity K of the DMRS sequences sent by the terminal device using the first DMRS port and/or the physical resource occupied by the each DMRS sequence in the K DMRS sequences according to a multiple access mode used by the terminal device in sending the DMRS sequences using the first DMRS port.

Specifically, the network device determines the quantity K of the DMRS sequences sent by the terminal device using the first DMRS port according to a first corresponding relation and the used multiple access mode; where, the first corresponding relation is configured to indicate a quantity of DMRS sequences corresponding to the first DMRS port under each multiple access mode in at least one multiple access mode.

The network device determines the physical resource occupied by the each DMRS sequence in the K DMRS sequences according to a second corresponding relation and the used multiple access mode; where, the second corresponding relation is configured to indicate a physical resource corresponding to each DMRS sequence in at least one DMRS sequence corresponding to the first DMRS port under each multiple access mode in the at least one multiple access mode.

In 240, the network device receives, on the determined physical resource occupied by the each DMRS sequence, the each DMRS sequence sent by the terminal device.

Therefore, in the implementations of the present disclosure, a quantity of DMRS sequences corresponding to one DMRS port may not be unique and may be flexibly changed. For example, such corresponding relationship may be set according to a multiple access mode used by a plurality of terminal devices which need orthogonal multiplexing, so that multi-user multiplexing of terminal devices that use different multiple access modes may be supported. Further, since the quantity of the DMRS sequences corresponding to one DMRS port and resource occupied by each sequence may be flexibly changed, it may be realized that there is at least one DMRS sequence in the terminal devices using different multiple access modes that corresponds to a same root sequence and/or occupy a same physical resource, so that the terminal devices using different multiple access modes can obtain DMRS orthogonality by using different cyclic shifts, thereby enabling multi-user multiplexing transmission supporting more terminal devices.

In order to facilitate a clearer understanding of the present disclosure, the multiple access mode is illustrated as the DFT-S-OFDM in the following, and resources occupied by multiple DMRS sequences are described in combination with FIG. 4 to FIG. 9.

Implementation 1

Figure 4:
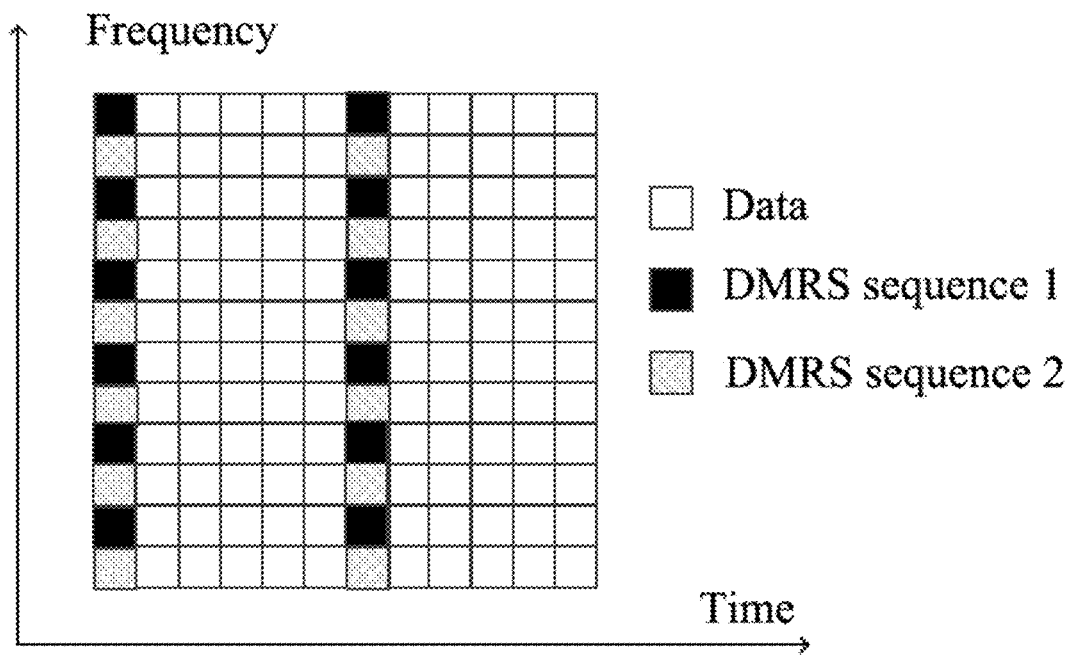
FIG. 4 is a schematic diagram of resource occupancy of a DMRS sequence according to an implementation of the present disclosure.
Figure 5:
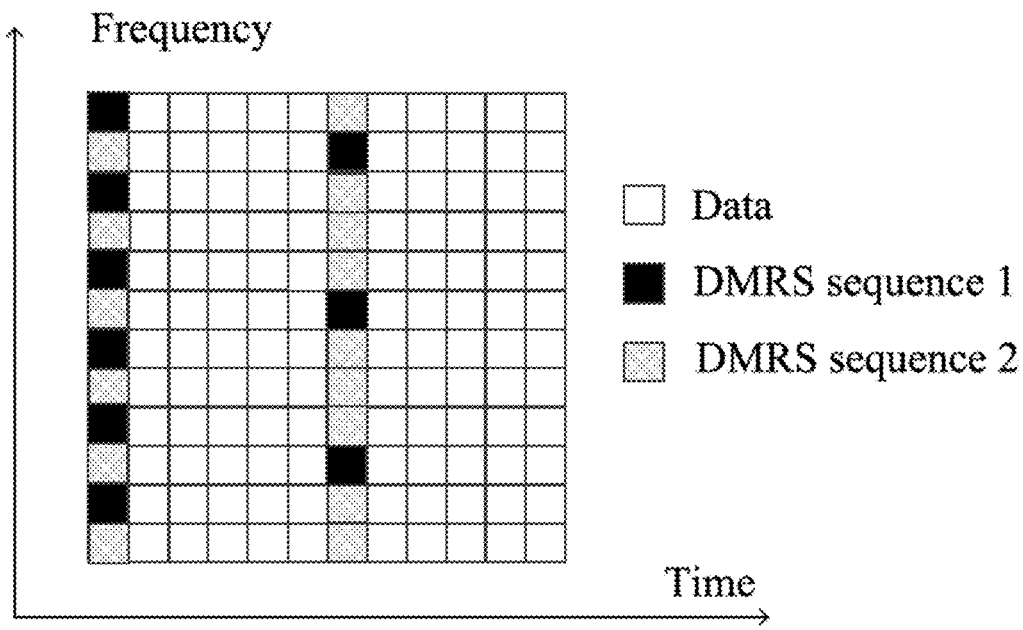
FIG. 5 is a schematic diagram of resource occupancy of a DMRS sequence according to an implementation of the present disclosure.

As shown in FIG. 4 and FIG. 5, when K=2, two DMRS sequences of a terminal device 1 respectively occupy an odd subcarrier and an even subcarrier in a physical resource block (PRB).

A DMRS sequence 2 may be combined with a DMRS sequence 1 to obtain a better channel estimation performance.

Sequences of the two DMRS sequences may be the same.

A DMRS sequence in FIG. 4 may occupy a same subcarrier in two OFDM symbols, and a DMRS sequence in FIG. 5 occupies different subcarriers in two OFDM symbols and use different densities.

If resource occupancy of the terminal device 1 using the DFT-S-OFDM multiple access mode is as shown in FIG. 4, a terminal device 2 using the CP-OFDM multiple access mode may use a DMRS resource occupation mode as shown in FIG. 3, thus, when the terminal device 1 and the terminal device 2 are multiplexed on a same resource, the DMRS sequence 1 may obtain orthogonality by using a same root sequence as a DMRS sequence of the terminal device 2, but a different cyclic shift from the DMRS sequence of the terminal device 2.

If the resource occupancy of the terminal device 1 using the DFT-S-OFDM multiple access mode is as shown in FIG.

5, a resource occupation mode of a DMRS sequence sent by the terminal device 2 using the CP-OFDM multiple access mode may be the same as that of the DMRS sequence 1, where the DMRS sequence sent by the terminal device 2 using the CP-OFDM multiple access mode may use different combs in different OFDMs. Specifically, on an OFDM symbol 1, comb=2, and on an OFDM symbol 2, comb=4.

Thus, the sequences in the DMRS sequences sent by the terminal device 1 and the terminal device 2 occupying the same resource can obtain orthogonality by using the same root sequence but different cyclic shifts.

Implementation 2

Figure 6:
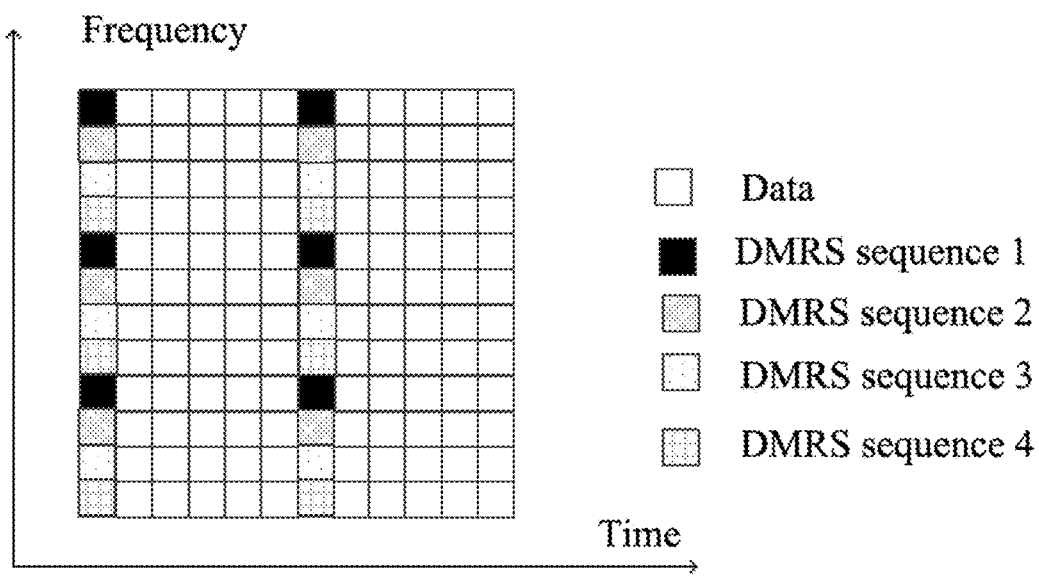
FIG. 6 is a schematic diagram of resource occupancy of a DMRS sequence according to an implementation of the present disclosure.
Figure 7:
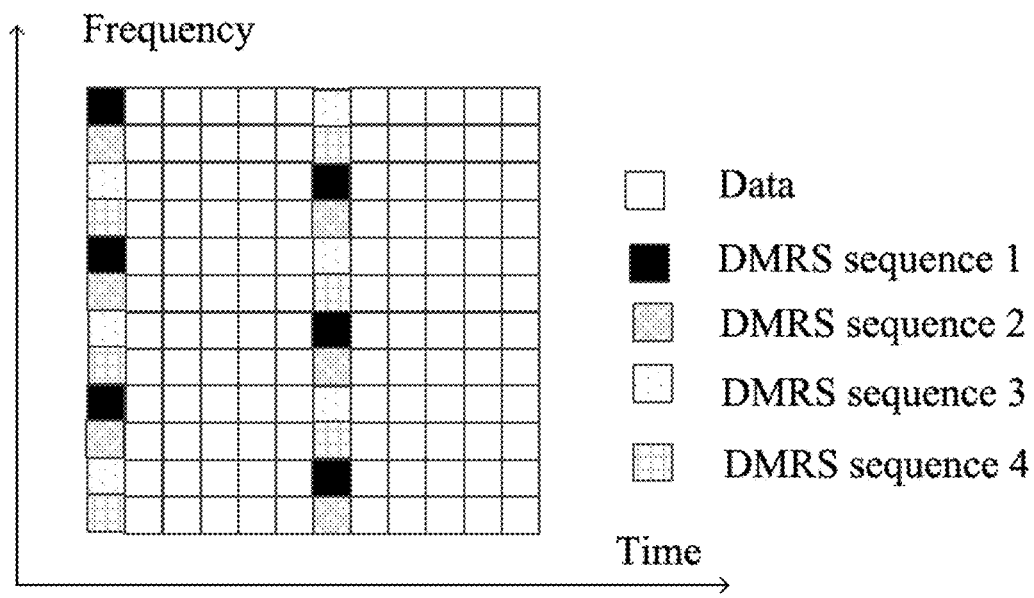
FIG. 7 is a schematic diagram of resource occupancy of a DMRS sequence according to an implementation of the present disclosure.

As shown in FIG. 6 and FIG. 7, when K=4, four DMRS sequences of a terminal device 3 respectively occupy $\{(4n+1)^{th}, (4n+2)^{th}, (4n+3)^{th}, (4n+4)^{th}\}$ subcarriers in a PRB, n=0, 1,2.

A DMRS sequence in FIG. 6 occupies a same subcarrier in two OFDM symbols, and a DMRS sequence in FIG. 7 occupies different subcarriers in two OFDM symbols and use a fixed subcarrier offset.

If a terminal device 4 using the CP-OFDM waveform uses a DMRS sequence of Comb=4, then, when the terminal device 3 and the terminal device 4 are multiplexed on a same resource, one of the DMRS sequences of the terminal device 3 (for example, a DMRS sequence 1) may obtain orthogonality by using a same root sequence as the DMRS sequence of the terminal device 4, but a different cyclic shift from the DMRS sequence of the terminal device 4. At the same time, DMRS subsequences {2, 3, 4} may be combined with a DMRS subsequence 1 to obtain a better channel estimation performance.

Further, if a DMRS resource of a terminal device using the CP-OFDM multiple access mode supports offset in the frequency domain, it is not necessary to perform additional configuration on a terminal device using the DFT-S-OFDM multiple access mode to ensure mutual DMRS orthogonality.

Implementation 3

Figure 8:
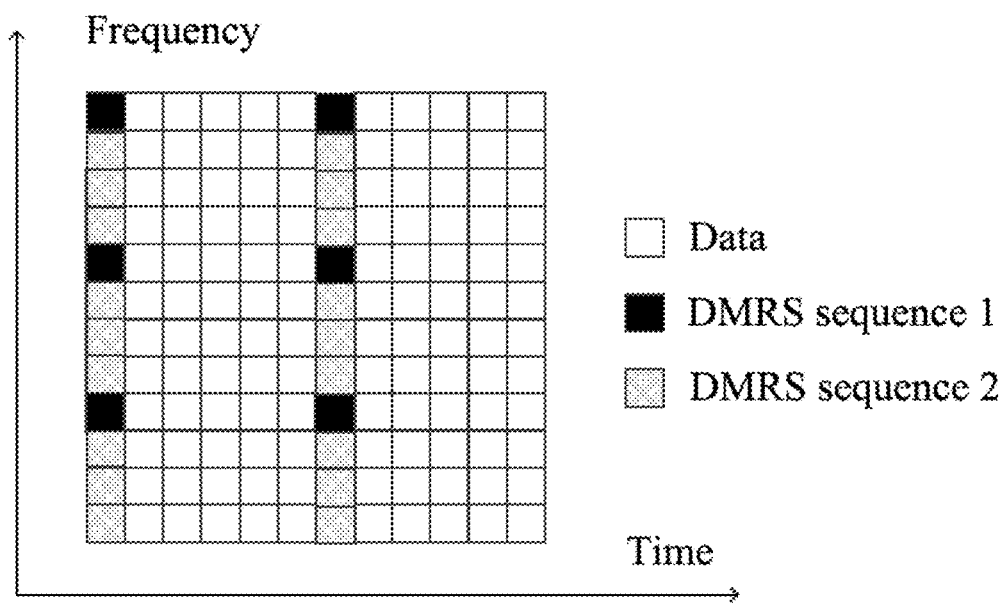
FIG. 8 is a schematic diagram of resource occupancy of a DMRS sequence according to an implementation of the present disclosure.
Figure 9:
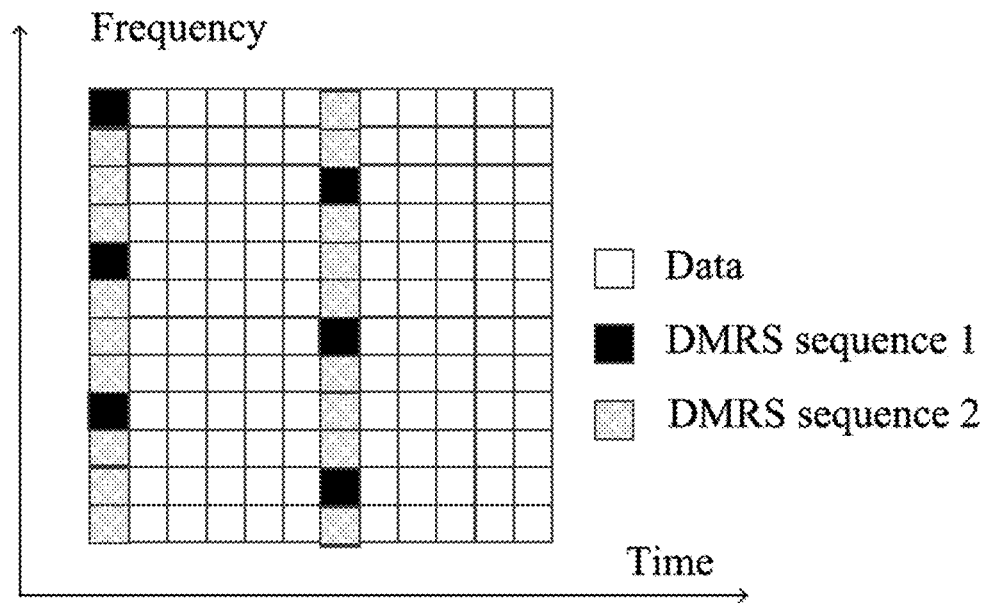
FIG. 9 is a schematic diagram of resource occupancy of a DMRS sequence according to an implementation of the present disclosure.

As shown in FIG. 8 and FIG. 9, K=2, in two DMRS sequences of a terminal device 5, a first DMRS sequence occupies an $(4n+1)^{th}$ subcarrier in a PRB, n=0, 1, 2, and a second DMRS sequences occupies other subcarriers in the PRB.

A DMRS sequence in FIG. 8 occupies a same subcarrier in two OFDM symbols, and a DMRS sequence in FIG. 9 occupies different subcarriers in two OFDM symbols and use a fixed subcarrier offset.

If the terminal device 4 using the CP-OFDM waveform uses the DMRS sequence of Comb=4, then when the terminal device 5 and the terminal device 4 are multiplexed on a same resource, DMRS sequence 1 may obtain orthogonality by using a same root sequence as the DMRS sequence of the terminal device 4, but a different cyclic shift from the DMRS sequence of the terminal device 4. At the same time, a DMRS sequence 2 may be combined with a DMRS sequence 1 to obtain a better channel estimation performance.

Therefore, in this implementation of the present disclosure, in a situation where terminal devices using different multiple access methods performs multi-user multiplexing to send DMRS sequences, resources occupied by the DMRS sequences sent by the terminal device and a comb may be flexibly set, so that the terminal devices that support different multiple access modes may obtain orthogonality by cyclic shifting, thereby performing multi-user multiplexing.

Figure 10:
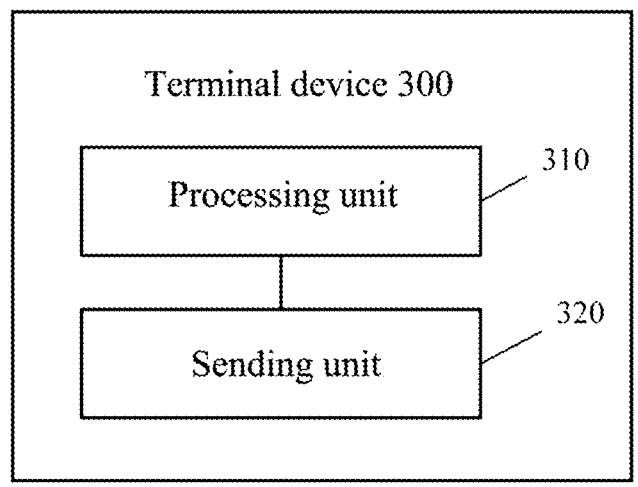
FIG. 10 is a schematic block diagram of a terminal device according to an implementation of the present disclosure.

FIG. 10 is a schematic block diagram of a terminal device 300 according to an implementation of the present disclosure. As shown in FIG. 10, the terminal device 300 includes a processing unit 310 and a sending unit 320.

The processing unit 310 is configured to determine a quantity K of demodulation reference signal (DMRS) sequences corresponding to a first DMRS port and a physical resource occupied by each DMRS sequence in the K DMRS sequences, where K is a positive integer; and the sending unit 320 is configured to send, on the physical resource occupied by the each DMRS sequence determined by the processing unit, the each DMRS sequence to a network device using the first DMRS port.

In an implementation, the processing unit 310 is further configured to:

determine the quantity K of the DMRS sequences corresponding to the first DMRS port and/or the physical resource occupied by the each DMRS sequence in the K DMRS sequences according to a multiple access mode used in sending the DMRS sequences using the first DMRS port.

In an implementation, the processing unit 310 is further configured to:

determine the quantity K of the DMRS sequences corresponding to the first DMRS port according to a first corresponding relation and the multiple access mode used in sending the DMRS sequences using the first DMRS port;

where, the first corresponding relation is configured to indicate a quantity of DMRS sequences corresponding to the first DMRS port under each multiple access mode in at least one multiple access mode.

In an implementation, the processing unit 310 is further configured to:

determine the physical resource occupied by the each DMRS sequence in the K DMRS sequences according to a second corresponding relation and the multiple access mode used in sending the DMRS sequences using the first DMRS port;

where, the second corresponding relation is configured to indicate a physical resource corresponding to each DMRS sequence in at least one DMRS sequence corresponding to the first DMRS port under each multiple access mode in the at least one multiple access mode.

In an implementation, when the multiple access mode used in sending the DMRS sequences using the first DMRS port is a first multiple access mode, the K DMRS sequences include a first DMRS sequence, where the first DMRS sequence occupies a same physical resource and/or uses a same root sequence as a second DMRS sequence included in DMRS sequences transmitted using a same DMRS port when a second multiple access mode is used, where the second multiple access mode is difference from the first multiple access mode.

In an implementation, the first multiple access mode is a discrete Fourier transform orthogonal frequency division multiplexing based spread spectrum DFT-S-OFDM multiple access mode, and the second multiple access mode is a cyclic prefix orthogonal frequency division multiplexing (CP-OFDM) multiple access mode; or, the first multiple access mode is the CP-OFDM multiple access mode, and the second multiple access mode is the DFT-S-OFDM multiple access mode.

In an implementation, when the multiple access mode used in sending the DMRS sequences using the first DMRS port is the DFT-S-OFDM multiple access mode, K is an integer greater than 1; and/or, when the multiple access mode used in sending the DMRS sequences using the first DMRS port is the CP-OFDM multiple access mode, K is 1.

In an implementation, the processing unit 310 is further configured to:

determine the quantity K of the DMRS sequences corresponding to the first DMRS port according to DMRS sequence indication information carried in downlink control information DCI transmitted by scheduling data corresponding to the DMRS sequences by the network device.

In an implementation, K is an integer greater than 1.

In an implementation, when a value of K is greater than 1, DMRS sequences in the K DMRS sequences having a same length use a same sequence.

In an implementation, when a value of K is greater than 1, the each DMRS sequence in the K DMRS sequences occupies, in at least one OFDM symbol, different sub-carriers in a same frequency domain bandwidth respectively.

In an implementation, a sub-carrier occupied by an $m^{th}$ DMRS sequence in the K DMRS sequences is: an $(m+iK)^{th}$ sub-carrier in the frequency domain bandwidth, where $i=0,1 \ldots \lfloor(S-m)/K\rfloor$, and S is a quantity of sub-carriers included in the frequency domain bandwidth.

In an implementation, K=2, and a subcarrier occupied by a first DMRS sequence in the K DMRS sequences is an $(n+jN)^{th}$ in the frequency domain bandwidth, a second DMRS sequence occupies the rest subcarrier in the frequency domain bandwidth, where $j=0,1 \ldots \lfloor(S-n)/N\rfloor$, N is a positive integer greater than 1, and n is a positive integer less than or equal to N.

In an implementation, each DMRS sequence in at least one DMRS sequence in the K DMRS sequences occupies different sub-carriers in different OFDM symbols.

In an implementation, the processing unit 310 is further configured to:

determine the quantity K of the DMRS sequences corresponding to the first DMRS port; and determine a resource offset between physical resources occupied by different DMRS sequences in the K DMRS sequences according to the quantity K when the K is greater than 1.

It should be understood that, the terminal device 300 may be corresponding to the terminal device in the method 200 and can implement corresponding functions of the terminal device in the method 200, which will not be repeated herein for the sake of conciseness.

Figure 11:
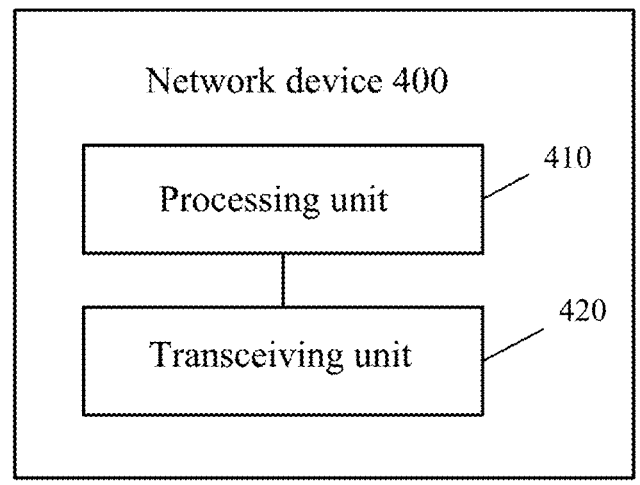
FIG. 11 is a schematic block diagram of a network device according to an implementation of the present disclosure.

FIG. 11 is a schematic block diagram of a network device 400 according to an implementation of the present disclosure. As shown in FIG. 11, the network device includes a processing unit 410 and a transceiving unit 420.

The processing unit 410 is configured to determine a quantity K of demodulation reference signal DMRS sequences sent by a terminal device using a first DMRS port and a physical resource occupied by each DMRS sequence in the K DMRS sequences; and the transceiving unit 420 is configured to receive, on the determined physical resource occupied by the each DMRS sequence, the each DMRS sequence sent by the terminal device.

In an implementation, the processing unit 410 is further configured to:

determine the quantity K of the DMRS sequences sent by the terminal device using the first DMRS port and/or the physical resource occupied by the each DMRS sequence in the K DMRS sequences according to a multiple access mode used by the terminal device in sending the DMRS sequences using the first DMRS port.

In an implementation, the processing unit 410 is further configured to:

determine the quantity K of the DMRS sequences sent by the terminal device using the first DMRS port according to a first corresponding relation and the multiple access mode used by the terminal device in sending the DMRS sequences using the first DMRS port; where, the first corresponding relation is configured to indicate a quantity of DMRS sequences corresponding to the first DMRS port under each multiple access mode in at least one multiple access mode.

In an implementation, the processing unit 410 is further configured to:

determine the physical resource occupied by the each DMRS sequence in the K DMRS sequences according to a second corresponding relation and the multiple access mode used by the terminal device in sending the DMRS sequences using the first DMRS port; where, the second corresponding relation is configured to indicate a physical resource corresponding to each DMRS sequence in at least one DMRS sequence corresponding to the first DMRS port under each multiple access mode in the at least one multiple access mode.

In an implementation, the transceiving unit 420 is further configured to:

indicate the quantity K of the DMRS sequences corresponding to the first DMRS port to the terminal device by DMRS sequence indication information carried in downlink control information DCI transmitted by scheduling data corresponding to the DMRS sequences.

In an implementation, when the multiple access mode used by the terminal device in sending the DMRS sequences using the first DMRS port is a DFT-S-OFDM multiple access mode, K is an integer greater than 1; and/or, when the multiple access mode used by the terminal device in sending the DMRS sequences using the first DMRS port is a CP-OFDM multiple access mode, K is 1.

In an implementation, K is an integer greater than 1.

In an implementation, when a value of K is greater than 1, the each DMRS sequence in the K DMRS sequences occupies, in at least one OFDM symbol, different sub-carriers in a same frequency domain bandwidth respectively.

In an implementation, each DMRS sequence in at least one DMRS sequence in the K DMRS sequences occupies different sub-carriers in different OFDM symbols.

It should be understood that, the network device 400 may be corresponding to the network device in the method 200 and can implement corresponding functions of the network device in the method 200, which will not be repeated herein for the sake of conciseness.

Figure 12:
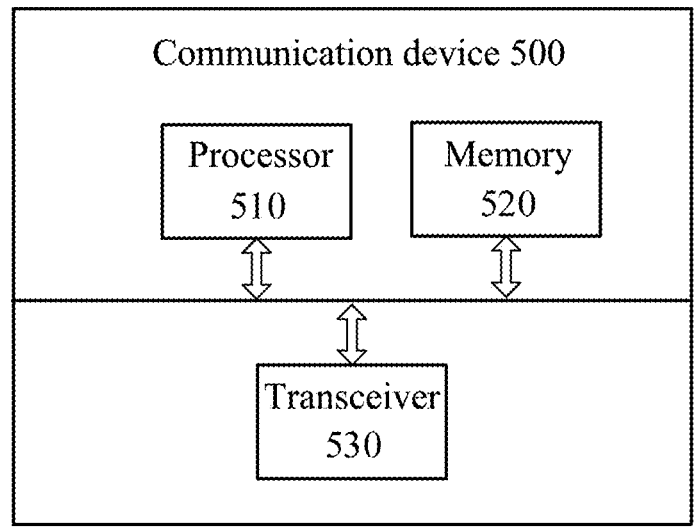
FIG. 12 is a schematic block diagram of a communication device according to an implementation of the present disclosure.

FIG. 12 is a schematic block diagram of a communication device 500 according to an implementation of the present disclosure. As shown in FIG. 12, the communication device 500 includes a processor 510 and a memory 520. The memory 520 may store a program code, and the processor 510 may execute the program code stored in the memory 520.

In an implementation, as shown in FIG. 12, the communication device 500 may include a transceiver 530, and the processor 510 may control the transceiver 530 to communicate with the outside.

In an implementation, the processor 510 may invoke the program code stored in the memory 520 to perform corresponding operations of the terminal device in the method 200 shown in FIG. 2, which will not be repeated herein for the sake of conciseness.

In an implementation, the processor 510 may invoke the program code stored in the memory 520 to perform corresponding operations of the network device in the method 200 shown in FIG. 2, which will not be repeated herein for the sake of conciseness.

Figure 13:
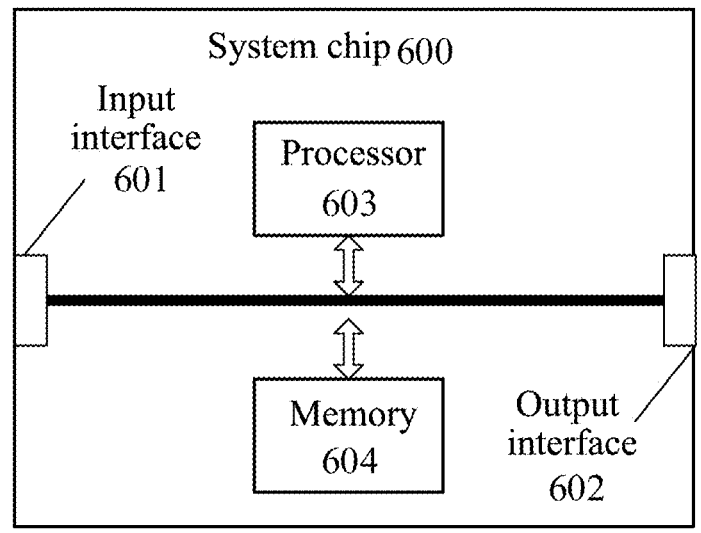
FIG. 13 is a schematic block diagram of a system chip according to an implementation of the present disclosure.

FIG. 13 is a schematic structural diagram of a system chip 600 according to an implementation of the present disclosure. The system chip 600 of FIG. 13 includes an input interface 601, an output interface 602, a processor 603 and a memory 604, which are connected by a communication connection, where the processor 603 is configured to execute a code in the memory 604.

In an implementation, when the code is executed, the processor 603 implements a method performed by the terminal device in the method 200 shown in FIG. 2, which will not be repeated herein for the sake of conciseness.

In an implementation, when the code is executed, the processor 603 implements a method performed by the network device in the method 200 shown in FIG. 2, which will not be repeated herein for the sake of conciseness.

Those skilled in the art will appreciate that units and algorithm steps of the various examples described in combination with the implementations disclosed herein may be implemented in electronic hardware or a combination of computer software and electronic hardware. Whether these functions are performed in hardware or software depends on specific applications and design constraints of the technical solution. Those skilled in the art may use different methods to implement the described functions for each particular application, but such implementation should not be considered to be beyond the scope of the present disclosure.

Those skilled in the art can clearly understand that, for the convenience and conciseness of the description, the specific working process of the systems, the apparatuses and the units described above may refer to the corresponding process in the foregoing method implementations, which will not be described herein again.

In the several implementations according to the present disclosure, it should be understood that, the disclosed systems, apparatuses, and methods may be implemented in other manners. For example, the apparatus implementations described above are merely illustrative. For example, the division of the units is only a logical function division. In actual implementation, there may be other division manners. For example, multiple units or components may be combined or may be integrated into another system, or some features may be ignored or not executed. In addition, the mutual coupling or direct coupling or communication connection shown or discussed may be an indirect coupling or communication connection through some interfaces, apparatuses or units, which may be in an electrical form, a mechanical form or other forms.

The units described as separate components may or may not be physically separated, and the components shown as units may or may not be physical units, that is, may be located in one place, or may be distributed to multiple network units. Some or all of the units may be selected according to actual needs to achieve the purpose of the solution of this implementation.

In addition, functional units in the implementation of the present disclosure may be integrated into one processing unit, or each unit may exist physically separately, or two or more units may be integrated into one unit.

The functions may be stored in a computer readable storage medium if implemented in the form of a software functional unit and sold or used as a standalone product. Based on such understanding, the technical solutions of the present disclosure essentially, or its portion contributing to the prior art, or a portion of the technical solutions, may be embodied in the form of a software product, where the computer software product is stored in a storage medium including several instructions to cause a computer device (which may be a personal computer, a server, or a network device, or the like) to perform all or part of the steps of the methods described in the implementations of the present disclosure. The foregoing storage medium includes various media that can store a program code, such as a U disk, a mobile hard disk, a read-only memory (ROM), a random access memory (RAM), a magnetic disk, or an optical disk, or the like.

The foregoing is only specific implementations of the present disclosure, but the protection scope of the present disclosure is not limited thereto, and any change or substitution that can be easily conceived by those skilled in the art within the technical scope disclosed by the present disclosure should be covered within the protection scope of the present disclosure. Therefore, the protection scope of the present disclosure should be subjected to the protection scope of the claims.

What is claimed is:

1. A wireless communication method, comprising:
   determining, by a terminal device, a quantity K of demodulation reference signal (DMRS) sequences corresponding to a first DMRS port and a physical resource occupied by each DMRS sequence in the K DMRS sequences, wherein K is a positive integer; and
   sending, on the determined physical resource occupied by the each DMRS sequence, the each DMRS sequence to a network device using the first DMRS port;
   wherein, when a value of K is greater than 1, the each DMRS sequence in the K DMRS sequences occupies, in at least one orthogonal frequency division multiplexing (OFDM) symbol, different sub-carriers in a same frequency domain bandwidth from other DMRS sequences in the K DMRS sequences, and a sub-carrier occupied by an $m^{th}$ DMRS sequence in the K DMRS sequences is: an $(m+iK)^{th}$ sub-carrier in the frequency domain bandwidth, wherein i=0,1 ... $\lfloor(S-m)/K\rfloor$ and S is a quantity of sub-carriers comprised in the frequency domain bandwidth.

2. The method according to claim 1, wherein, the determining, by a terminal device, a quantity K of demodulation reference signal (DMRS) sequences corresponding to a first DMRS port, comprises:
   determining, by the terminal device, the quantity K of the DMRS sequences corresponding to the first DMRS port according to DMRS sequence indication information carried in downlink control information (DCI) transmitted by scheduling data corresponding to the DMRS sequences by the network device.

3. The method according to claim 1, wherein, K is an integer greater than 1.

4. The method according to claim 1, wherein, when a value of K is greater than 1, DMRS sequences in the K DMRS sequences having a same length use a same sequence.

5. The method according to claim 1, wherein, K=2, and a subcarrier occupied by a first DMRS sequence in the K DMRS sequences is an $(n+jN)^{th}$ subcarrier in the frequency domain bandwidth, a second DMRS sequence occupies the rest subcarrier in the frequency domain bandwidth, wherein j=0,1 ... $\lfloor(S-n)/N\rfloor$, N is a positive integer greater than 1, and n is a positive integer less than or equal to N.

6. The method according to claim 1, wherein, each DMRS sequence in at least one DMRS sequence in the K DMRS sequences occupies different sub-carriers in different OFDM symbols.

7. The method according to claim 1, wherein, the determining, by a terminal device, a quantity K of DMRS sequences corresponding to a first DMRS port and a physical resource occupied by each DMRS sequence in the K DMRS sequences, comprises:
   determining, by the terminal device, the quantity K of the DMRS sequences corresponding to the first DMRS port; and
   determining, by the terminal device, a resource offset between physical resources occupied by different DMRS sequences in the K DMRS sequences according to the quantity K when the K is greater than 1.

8. A wireless communication method, comprising:
   determining, by a network device, a quantity K of demodulation reference signal (DMRS) sequences sent by a terminal device using a first DMRS port and a physical resource occupied by each DMRS sequence in the K DMRS sequences; and
   receiving, on the determined physical resource occupied by the each DMRS sequence, the each DMRS sequence sent by the terminal device;
   wherein, when a value of K is greater than 1, the each DMRS sequence in the K DMRS sequences occupies, in at least one orthogonal frequency division multiplexing (OFDM) symbol, different sub-carriers in a same frequency domain bandwidth from other DMRS sequences in the K DMRS sequences, and a sub-carrier occupied by an $m^{th}$ DMRS sequence in the K DMRS sequences is: an $(m+iK)^{th}$ sub-carrier in the frequency domain bandwidth, wherein i=0,1 ... $\lfloor(S-m)/K\rfloor$, and S is a quantity of sub-carriers comprised in the frequency domain bandwidth.

9. The method according to claim 8, wherein, the method further comprises:
   indicating, by the network device, the quantity K of the DMRS sequences corresponding to the DMRS port to the terminal device by DMRS sequence indication information carried in downlink control information (DCI) transmitted by scheduling data corresponding to the DMRS sequences.

10. The method according to claim 8, wherein, K is an integer greater than 1.

11. The method according to claim 8, wherein, each DMRS sequence in at least one DMRS sequence in the K DMRS sequences occupies different sub-carriers in different OFDM symbols.

12. A terminal device, comprising: a transceiver, a memory, a processor, and a computer program stored on the memory and operable on the processor,
   wherein the processor, when running the computer program, is configured to:
   determine a quantity K of demodulation reference signal (DMRS) sequences corresponding to a first DMRS port and a physical resource occupied by each DMRS sequence in the K DMRS sequences, wherein K is a positive integer; and
   control the transceiver to send, on the physical resource occupied by the each DMRS sequence determined by the processor, the each DMRS sequence to a network device using the first DMRS port;
   wherein, when a value of K is greater than 1, the each DMRS sequence in the K DMRS sequences occupies, in at least one orthogonal frequency division multiplexing (OFDM) symbol, different sub-carriers in a same frequency domain bandwidth from other DMRS sequences in the K DMRS sequences, and a sub-carrier occupied by an $m^{th}$ DMRS sequence in the K DMRS sequences is: an $(m+iK)^{th}$ sub-carrier in the frequency domain bandwidth, wherein i=0,1 ... $\lfloor(S-m)/K\rfloor$, and S is a quantity of sub-carriers comprised in the frequency domain bandwidth.

13. The terminal device according to claim 12, wherein, the processor is further configured to:
   determine the quantity K of the DMRS sequences corresponding to the first DMRS port according to DMRS sequence indication information carried in downlink control information (DCI) transmitted by scheduling data corresponding to the DMRS sequences by the network device.

14. The terminal device according to claim 12, wherein, K is an integer greater than 1.

15. The terminal device according to claim 12, wherein, when a value of K is greater than 1, DMRS sequences in the K DMRS sequences having a same length use a same sequence.

16. The terminal device according to claim 12, wherein, K=2, and a subcarrier occupied by a first DMRS sequence in the K DMRS sequences is an $(n+jN)^{th}$ subcarrier in the frequency domain bandwidth, a second DMRS sequence occupies the rest subcarrier in the frequency domain bandwidth, wherein j=0,1 ... $\lfloor(S-n)/N\rfloor$, N is a positive integer greater than 1, and n is a positive integer less than or equal to N.

17. The terminal device according to claim 12, wherein, each DMRS sequence in at least one DMRS sequence in the K DMRS sequences occupies different sub-carriers in different OFDM symbols.

18. The terminal device according to claim 12, wherein, the processor is further configured to:
   determine the quantity K of the DMRS sequences corresponding to the first DMRS port; and
   determine a resource offset between physical resources occupied by different DMRS sequences in the K DMRS sequences according to the quantity K when the K is greater than 1.

* * * * *